Figure 1:
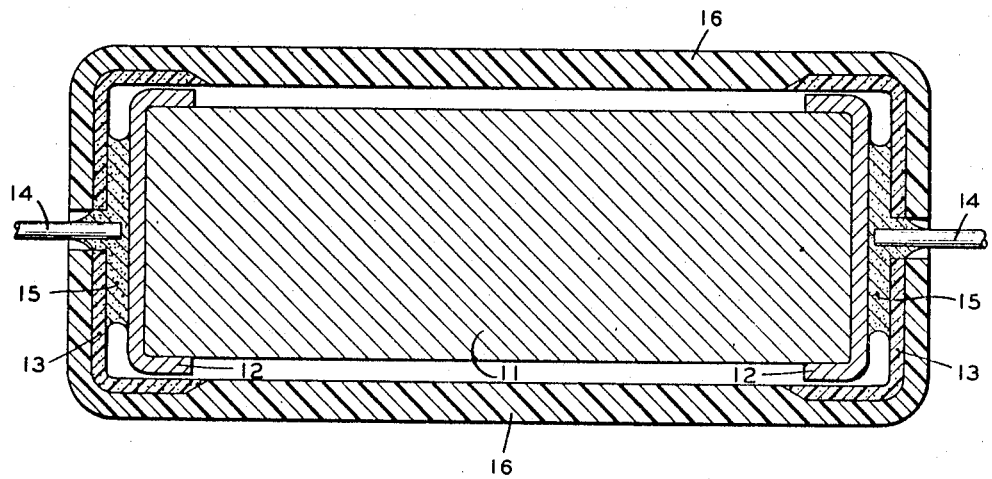

May 12, 1953      L. C. RUBIN      2,638,523

METAL TO PLASTIC BONDING

Filed May 24, 1952

*INVENTOR.*
LOUIS C. RUBIN
BY G. H. Palmer
Ernest Cheslow
ATTORNEYS

Patented May 12, 1953

2,638,523

UNITED STATES PATENT OFFICE 2,638,523

METAL TO PLASTIC BONDING

Louis C. Rubin, West Caldwell, N. J., assignor to
The M. W. Kellogg Company, Jersey City, N. J.,
a corporation of Delaware Application May 24, 1952, Serial No. 289,766

14 Claims. (Cl. 201—64)

This invention relates to bonding and more particularly to an article and method to aid in the bonding of plastic polytrifluorochloroethylene to metal, and most particularly to an article and method to aid in the hermetic sealing of electrical elements. The articles contemplated by this invention have at least one metal-bondable surface having a composition of high metallic content and containing a perhalogenated compound, polymeric trifluorochloroethylene as a binding material.

It is known that solid polymeric trifluorochloroethylene has physical, chemical and electrical properties which makes it an excellent insulating material and corrosion protection material. The use of this polymer to seal electrical elements, especially in the electronic field would be highly advantageous provided a true hermetic seal can be readily obtained. At present, a hermetic sealing is obtained on such things as terminals by making a tortuous leak path and so designing the piece that the shrinkage of the polymeric trifluorochloroethylene on cooling from the molding temperature makes a mechanical seal against the tortuous leak path. However, this is not always a feasible design. For example, the leads from a resistor are ordinarily just straight wires. It has been impossible to get a trifluorochloroethylene polymer to seal against small diameter wire sufficiently tightly to make a seal.

It has been found that a structure may be built up going from very nearly 100% powdered metal on one side to 100% polymerized trifluorochloroethylene on the other side. This leaves a surface on one side which can be bonded to wire or other metal surfaces. It can be soldered, for example, on an electrical piece thus making a hermetic seal on which plastic polymerized trifluorochloroethylene can be bonded.

The plastic polymer produced from trifluorochloroethylene is hard, but not brittle, and is flowable under pressure at temperatures above about 225° C. One of the most important physical characteristics of the plastic is its hardness and strength and this is measured in terms of no strength temperature (N. S. T.). A polymer of suitable plastic characteristics for sealing purposes has a no strength temperature between about 240° C. and about 340° C. The no strength temperature of the polymer and its method of determination will be fully discussed hereinafter. Four-fifths of the weight of the polymer is made up of two halogens, fluorine and chlorine. The plastic is colorless and transparent and has a high chemical stability with no effect being observed on the polymer after prolonged exposure to concentrated sulfuric acid, hydrochloric acid and hydrofluoric acid. Also, no effect is observed on the polymer after prolonged exposure to strong caustic solutions, fuming nitric acid, aqua regia and other vigorous oxidizing materials. The plastic is flexible and resilient and is not wetted by water and is unaffected by high humidity. The plastic has superior electrical characteristics, as shown in Table I below:

TABLE I

Solid polymer of trifluorochloroethylene

| Electrical Frequency cycles/sec. | Dielectric Constant E | Dielectric Power Loss Tan |
|---|---|---|
| $1 \times 10^2$ | 2.72 | $0.022 \pm 0.0011$ |
| $1 \times 10^3$ | 2.63 | $0.27 \pm 0.0014$ |
| $1 \times 10^4$ | 2.53 | $0.023 \pm 0.0012$ |
| $1 \times 10^5$ | 2.46 | $0.0135 \pm 0.0008$ |
| $1 \times 10^6$ | 2.43 | $0.0082 \pm 0.0004$ |
| $1 \times 10^7$ | 2.35 | $0.0060 \pm 0.0003$ |
| $1 \times 10^8$ | 2.30 | $0.0028 \pm 0.0002$ |
| $3 \times 10^8$ | 2.30 | 0.0030 |
| $3 \times 10^9$ | 2.30 | $0.0028 \pm 0.0002$ |
| $1 \times 10^{10}$ | 2.29 | $0.0039 \pm 0.0002$ |
| $2.5 \times 10^{10}$ | 2.29 | 0.0055 |

Included also in this disclosure are the general physical characteristics of the plastic polymer of trifluorochloroethylene. These physical characteristics are tabulated in Table II below:

TABLE II

| Tests Conducted on Plastic | Unit of Measure | Results | ASTM Test Method |
|---|---|---|---|
| Specific gravity | | 2.1 | D792–48T. |
| Refractive index | $n_D^{25}$ | 1.43 | D542–42. |
| Thermal coefficient of linear expansion: | | | |
| −80° to 20° C | in./in. ° C | $4.5 \times 10^{-5}$ | D696–44. |
| 20° to 150° C | in./in. ° C | $7 \times 10^{-5}$ | D696–44. |
| Thermal conductivity | cal./cm.²/sec./° C./cm | $1.44 \times 10^{-4}$ | |
| Do | K | 0.418 | |
| Specific heat | cal./gm | 0.216 | |
| Water absorption | percent | 0.00 | D570–42. |
| Outdoor aging, one year | | (¹) | (¹). |
| Rockwell hardness | R scale | 111–115 | D785–48T. |
| Durometer hardness | D scale | 80 | D676–47T. |
| Durometer hardness | A scale | 100 | D676–47T. |
| Impact strength, Izod, notched, 77° F | ft. lb./in. of notch | 3.62 | D256–47T. |
| Yield strength, 0.2% offset | p. s. i. 77° F | 3,640 | D638–46T. |
| Flexural strength | p. s. i. 77° F | 8,260 | D790–45T. |
| Compressive strength | p. s. i. 77° F | 32–87,600 | D695–44T. |
| Modulus of elasticity: | | | |
| Tensile | p. s. i. 77° F | 226,000 | D638–46T. |
| Flexural | p. s. i. 77° F | 182,500 | D790–45T. |
| Compressive | p. s. i. 77° F | 191,000 | D695–44T. |
| Abrasion resistance: | | | |
| 59.9946 gm. heat-treated | loss/gm./1,000 cycles | 0.0048 | Fed. spec. L-P-406-a method 1091. |
| 57.3753 gm. quenched | loss/gm./1,000 cycles | 0.0175 | L-P-406-a method 1091. |

¹ No detectable change.

The solid polymers of trifluorochloroethylene are prepared by polymerizing the monomer in the presence of a suitable organic peroxide, such as bis-trifluoroacetyl peroxide as a polymerizing agent, at a temperature between about −20° C. and about 25° C., preferably at a temperature of about −16° C., at which temperature the plastic is produced. At a temperature of about −16° C., the polymerization of trifluorochloroethylene to a satisfactory yield of plastic polymer is accomplished in about 7 days. At elevated temperatures and superatmospheric pressures less time is required to complete the polymerization and the waxes are generally produced. As the preparation of the polymer is not a part of this invention, further discussion thereof is deemed unnecessary. A discussion of the method of preparing the high molecular weight polymer of trifluorochloroethylene may be found in the patent to William T. Miller, Serial No. 2,579,437, issued December 18, 1951.

To distinguish the plastic polymer over the oils and waxes produced with the same monomer, the polymer is described by reference to its no strength temperature. No strength temperature (N. S. T.) of between about 210° C. and about 350° C. is characteristic of a normally solid polymer of the above preparation having plastic characteristics. Best plastic characteristics of the normally solid polymer are observed at N. S. T. values between about 240° C. and 340° C. The N. S. T. values of the polymer depend upon such factors as temperature, residual time, concentration of promoter, pressure, etc. Since this invention does not relate to the method of producing the polymer or particular characteristics, further discussion thereof will not be undertaken.

The no strength temperature (N. S. T.) is determined in the following manner: A sample of normally solid polytrifluorochloroethylene is hot pressed into a $\frac{1}{16}''$ thick sheet and cut into a strip of $\frac{1}{8}'' \times \frac{1}{16}'' \times 1\frac{5}{8}''$. The strip is notched $\frac{5}{8}''$ from the top so that the dimension at the notch shall be $\frac{1}{16}'' \times \frac{1}{16}''$. A fine wire and a standard weight is attached to one end of the strip. The weight of the polymer plus the wire and standard weight shall equal 0.5 gram. The strip is then attached in a furnace and fixed vertically therein. The temperature of the sample is increased at a rate of about 1½° C. per minute in the furnace as the breaking temperature is approached. The no strength temperature (N. S. T.) is the breaking temperature of the sample. Differences of about 5° C. are considered significant.

For the purposes of this invention thermoplastic polymers of trifluorochloroethylene having N. S. T. valued between about 240° C. and about 340° C. may be used.

This invention has as an object to provide an article which is both bondable to metal and moldable so that it can serve to join metallic to plastic elements and provide a hermetic seal.

A further object is to provide a method for effecting a sealed junction between metal and polymerized trifluorochloroethylene.

A still further object is to provide electrical elements, and particularly electrical resistors, hermetically sealed in polymerized trifluorochloroethylene.

Other objects will appear hereinafter.

These and other objects are accomplished by the following invention. An article is made comprising a plastic component of a thermoplastic polymer of trifluorochloroethylene and a metallic component comprising finely divided metal particles, said article ranging in composition from nearly 100% of the metallic component on a solderable surface to 100% of the plastic component on the opposite surface.

The articles of this invention are prepared, in general, by the application of molding pressures and temperatures to appropriate mixtures of metal powder and powdered plastic trifluorochloroethylene. The optimum composition on the surface intended to be soldered may vary depending upon the particular metal used and the characteristics desired, but in general, will range between 80% to 95%, by weight, of the metal powder. At higher concentrations of metal powder there is insufficient plastic for an adequate bond between the metal particles. At lower concentrations of metal powder the surface is difficult to solder. In some cases compositions with lower concentrations of metal powder, as low as 60% may be successfully soldered, but concentrations of 80% and above are more dependable. In some cases compositions with higher concentrations than 95%, up to substantially 100%, may be obtained by molding at the very surface but not in a layer of appreciable thickness. If it is desired to have a layer of pure metal on the solderable surface, the metal may be applied to the surface after the article is molded by electro-deposition. In general, however, it is unnecessary to have pure metal on the surface, since the molded mixtures with surface concentrations of metal of 80 weight per cent, or higher, can be readily soldered.

The composite articles of this invention may be formed either before or after juncture of the metal-containing layer to the metallic surface to be sealed. In other words, the metal-containing layer may be bonded to the metal before being molded to the pure plastic layer, or it may be molded to the plastic layer before being bonded to the metal. The procedure selected depends on convenience factors, such as the equipment available at the several stages and the shapes involved. Simpler shapes lend themselves more readily to premolding.

The cross-sectional view of a sealed resistor element in accordance with this invention is represented in Figure 1 wherein the spaces between unbonded surfaces are exaggerated for the purpose of clarity. 11 represents the resistor element itself which is generally cylindrical in shape and composed of a graphite composition or another suitable resistance composition. The ends of the resistor element are encased in metal caps 12, which serve as terminals and which make good electrical contact with the resistor element. Surrounding the metal terminals are the perforated, cup-shaped, molded, metal-containing plastic layers 13, through which the lead wires 14 are passed. A small amount of solder 15 bonds the metal-containing plastic layer to the metal cap and the lead wire to both, so that good electrical connection is made. It is important that the lead wire pass through the molded article to make direct electrical contact with the metal terminal, particularly when the electrical element is a resistor. The molded metal and polymer mixture, while it is conductive, has high resistance and can even be used as a resistance composition. In order to maintain the calibrated value of the resistor it is important that the lead wire pass through the molded cap and be soldered with the cap onto the metal terminal of the resistor. The protective layer of pure polytrifluorochloroethylene plastic surrounds the entire article and is bonded to the metal-containing layer by molding.

Ordinarily, the sealed resistor of Figure 1 is prepared by soldering the molded cup-shaped metal-containing layer to the metal cap and the lead wire through the perforation to both. The soldered article is then placed in a mold and a layer of plastic polytrifluorochloroethylene is molded around it by known molding methods as by compression molding, injection molding or transfer molding. To accommodate the lead wires there are grooves in the mold sections which are machined to fit the wires so closely that the plastic does not escape through the aperture.

Compression molding, injection molding and transfer molding processes are sufficiently well-known so that it is unnecessary to describe them in detail here. The general techniques of molding procedures are described in a number of standard works of reference. More detailed discussion with particular reference to polytrifluorochloroethylene conditions may be found in my copending applications Serial No. 136,401, which deals with compression molding; Serial No. 136,403 which deals with injection molding; and Serial No. 136,404 which deals with transfer molding, all filed on December 31, 1949.

Figure 2:
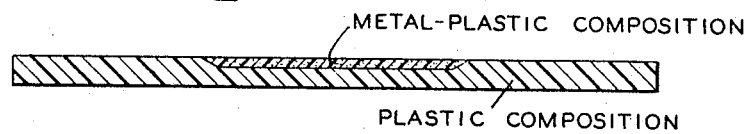
Figure 3:
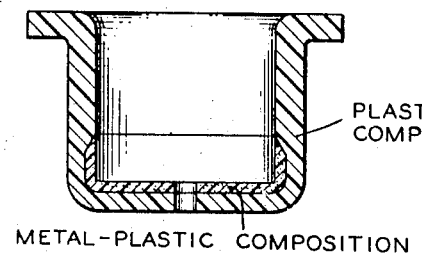

Alternatively, the sealed resistor of Figure 1 may be prepared by soldering one composite, molded, flanged and perforated, cup-shaped section, as shown in Figure 3, to each end of the resistor and then sealing the flanged sections to each other by the application of molding temperatures and pressures at the flange. The composite, cup-shaped section of Figure 3 may be stamped from a composite flat sheet, such as that of Figure 2, which in turn may be molded in either one or two stages as well-known in the art. The lead wire aperture may be provided either in the molding step or in the stamping step. Alternatively, composite cup-shaped section of Figure 3 may be molded in that shape in two stages, for example, by molding the cup-shaped pure polymer layer first and then molding an inner metal-containing layer to it. The inner layer need not be cup-shaped as shown in Figures 1 and 3 but may be flat for more convenient premolding.

Although described particularly with reference to the sealing of electrical elements, it is apparent that other composite articles may be used for other sealing purposes, as long as they are designed to have a metal-containing layer in contact with the metal surface and a protective layer of plastic polytrifluorochloroethylene. For example, to protect metal chemical apparatus against the effects of corrosive materials at moderate temperatures with a layer of polymerized trifluorochloroethylene a composite article with a solderable surface of a metal-polymer mixture may be prepared and soldered directly on the metal surface to be protected. Or, a flat metal surface may be protected by molding a composite flat piece with a layer of pure polytrifluorochloroethylene on one side and a solderable layer on the other. Simple flat articles may be molded in as many layers as desired. In general, two layers are sufficient. A uniform mixture of metal powder and powdered plastic trifluorochloroethylene polymer containing 80 to 95 weight per cent of metal powder is placed on the bottom of the mold in an amount calculated to form a finished layer of the desired thickness. This layer is compressed without heating in the mold to reduce its volume and then covered by a layer of pure powdered plastic trifluorochloroethylene polymer which is similarly compressed cold. If the mold is large enough the first compression step may be eliminated. The powders are then pre-heated under slight positive pressure at a temperature between 250° C. and 260° C. and then molded at a pressure of about 5000 pounds per square inch. The optimum temperature will vary with the N. S. T. value of the polymer used, lower molding temperatures being used with lower N. S. T. values so that the molding temperature ordinarily does not exceed the no strength temperature.

Molding pressures may vary widely, in general, running higher for higher concentrations of metal powder, higher for lower molding temperatures and higher for thinner or more complicated shapes. The pressures may vary from as low as 500 pounds per square inch to as high as 25,000 pounds per square inch. For molding a simple shape with a composition of 90 per cent copper by weight at a molding temperature of 250° C., it is preferred that the molding pressure be between 4500 and 5500 pounds per square inch. In order to obtain a uniform composition in the layers containing metal powders the particles should be finely divided, and preferably sufficiently finely divided to pass through a standard 100 mesh screen. The polymer should also be finely divided and preferably sufficiently finely divided to pass through a 100 mesh screen. In the layer of pure polymer the powder need not be finely divided.

A simple way to obtain a uniform mixture of metal powder and polymer powder is to grind them together to the desired degree of fineness. Small amounts may be ground together in a mortar and larger quantities can be prepared by grinding in a micropulverizer.

EXAMPLE

It is desired to prepare a flat composite disc of 1⅛" diameter with a ⅛" layer of copper composition and a 1/16" layer of pure polymer. From previous moldings, it is known that a cubic inch of a molded composition containing 90% of copper and 10% of polymerized trifluorochloroethylene weighs 113.5 grams. Since a mold of 1⅛" diameter has a cross-sectional area of 1 square inch, it is necessary to use one-eighth of this amount, or 14.2 grams, of the powdered mixture for a molded layer of ⅛" thickness. Similarly, it may be determined that 2.2 grams of the pure polymer, having a molded weight of 35 grams per cubic inch will give a molded layer of 1/16" thickness.

A mixture of 90% by weight of copper and 10% by weight of polymerized trifluorochloroethylene, with an N. S. T. value of 300° C., is ground together to a fine powder in a mortar and pestle. 14.2 grams of this mixture is placed in the bottom of a mold of 1⅛" diameter and 2½" depth. The mixture is compacted cold under a pressure of about 1000 pounds per square inch. 2.2 grams of powdered pure polymer, of the same N. S. T. value, is then added and this, too, is compacted cold. The mold is placed between the hot platens, held at 260° C., of a press of 25 ton capacity, until the mold is heated to 240-250° C., holding a slight positive pressure. The mold is then quickly transferred to cold platens and the pressure brought as rapidly as possible to 5000 pounds per square inch. Final cooling is hastened by quenching in water after the initial set. Quenching improves the quality of the molded plastic by keeping it in the amorphous state. After cooling, the molded disc is removed. There are two distinct layers, one coppery and the other transparent, with perfect bonding between them. There is no difficulty in soldering a copper wire to the coppery side of the disc.

In the above description, copper powder has been used as the metal powder because of its easy solderability. But any metal or alloy with a melting point higher than that of the solder and higher than the molding temperature may be used. Furthermore, the metal to which the metal plastic layer is bonded may be any metal or alloy with a sufficiently high melting point. Metals and alloys, such as tin, silver, aluminum, titanium, carbon steel, stainless steel, brass, bronze and others may be used as the metallic powder of the composition and may be bonded to by such compositions. Some metals, such as aluminum, are difficult to solder and are not preferred in the composition but may nevertheless be soldered by known techniques. It is not essential that the metal powder in the composition be identical with that of the surface to be sealed, but may be preferable in that it simplifies the fluxing problem.

While the invention has been described with particular reference to soldering, it is not to be understood as being limited thereto. Other methods of bonding metal to metal may be used for bonding the metal to the metal plastic composition. For example, metal cements comprising sodium silicate are commonly used to bond metal to metal and may be used to bond the metal plastic layer to the metal to be protected. The use of cements may be advantageous in some cases, since it is not necessary with cements to use the elevated temperatures of soldering.

While the invention has been described with particular reference to pure polytrifluorochloroethylene as the protective layer and to two-component composition of metal and polytrifluorochloroethylene as the bonding layer, it is not to be understood as being limited thereto. Other ingredients, such as plasticizers, fillers and pigments may be added, depending on the characteristics desired, without departing from the scope of this invention. The referred plasticizers are the normally liquid and waxy polymers of trifluorochloroethylene, although any of the plasticizers previously disclosed as utilizable with polytrifluorochloroethylene may be used. The common stable fillers are calcium silicate, calcium carbonate, carbon black and titanium dioxide with particle dimensions of approximately 0.5 micron in diameter. Any inorganic pigments or organic pigments may be incorporated in the plastic composition.

The present invention includes within its scope copolymers of trifluorochloroethylene with minor amounts of other monomers, such as vinyl chloride, vinylidene fluoride, tetrafluoroethylene, perfluoropropene, perfluorobutadiene and acrylonitriles. It is to be understood that the term "polymer of trifluorochloroethylene," as used herein includes both the homopolymer and such copolymers as have comparable physical properties. With the exception of tetrafluoroethylene, the use of these other monomers is limited to less than about 15% by weight of the polymer, preferably less than about 5%, since greater amounts result in substantial alteration of the physical characteristics of the polymer. With tetrafluoroethylene greater amounts may be incorporated as copolymer.

I claim:

1. An article of manufacture comprising a plastic component of a thermoplastic polymer of trifluorochloroethylene and a metallic component comprising finely divided metal particles said article ranging in composition from a major proportion of the metallic component at a surface to none of the metallic component at the opposite surface.

2. An article of manufacture comprising a plastic component of a thermoplastic polymer of trifluorochloroethylene having a no strength temperature value between about 240° C. and about 340° C., and a metallic component comprising finely divided metal particles, said article ranging in composition from at least 60% by weight of the metallic component at a surface to none of the metallic component at the opposite surface.

3. An article of manufacture comprising a plastic component of a thermoplastic polymer of trifluorochloroethylene having a no strength temperature value between about 240° C. and about 340° C. and a metallic component comprising finely divided copper particles, said article ranging in composition from at least 60% by weight of the metallic component at a surface to none of the metallic component at the opposite surface.

4. An article of manufacture comprising a plastic component of a thermoplastic polymer of trifluorochloroethylene having a no strength temperature value between about 240° C. and about 340° C., and a metallic component comprising finely divided copper particles, said article ranging in composition from 80 to 95% by weight of copper at a surface to none of the metallic component at the opposite surface.

5. A sealing device for an electrical element comprising a perforated cup-shaped solid article adapted to be soldered on the inner surface to a metal conductor on the electrical element with a lead wire passing through the perforation, and adapted to be molded on the outer surface to a sealing layer of polymerized trifluorochloroethylene, said article comprising a plastic component of a thermoplastic polymer of trifluorochloroethylene and a metallic component comprising finely divided metal particles said article ranging in composition from a major proportion of the metallic component at the inner surface to none of the metallic component at the outer surface.

6. A sealing device for an electrical element comprising a perforated cup-shaped solid article adapted to be soldered on the inner surface to a metal conductor on the electrical element with a lead wire passing through the perforation, and adapted to be molded on the outer surface to a sealing layer of polymerized trifluorochloroethylene, said article comprising a plastic component of trifluorochloroethylene having a no strength temperature value between about 240° C. and about 340° C., and a metallic component comprising finely divided metal particles, said article ranging in composition from at least 60% by weight of the metallic component at the inner surface to none of the metallic component at the outer surface.

7. A sealing device for an electrical element comprising a perforated cup-shaped solid article adapted to be soldered on the inner surface to a metal conductor on the electrical element with a lead wire passing through the perforation, and adapted to be molded on the outer surface to a sealing layer of polymerized trifluorochloroethylene, said article comprising a plastic component of a thermoplastic polymer of trifluorochloroethylene having a no strength temperature value between about 240° C. and about 340° C. and a metallic component comprising finely divided copper particles, said article ranging in composition from at least 60% by weight of the metallic component at the inner surface to none of the metallic component at the outer surface.

8. A sealing device for an electrical element comprising a perforated cup-shaped solid article adapted to be soldered on the inner surface to a metal conductor on the electrical element with a lead wire passing through the perforation, and adapted to be molded on the outer surface to a sealing layer of polymerized trifluorochloroethylene, said article comprising a plastic component of a thermoplastic polymer of trifluorochloroethylene having a no strength temperature value between about 240° C. to about 340° C., and a metallic component comprising finely divided copper particles, said particles ranging in composition from 80 to 95% by weight of copper at the inner surface to none of the metallic component at the outer surface.

9. A sealing device for an electrical element comprising a perforated cup-shaped solid article adapted to be soldered on the inner surface to a metal conductor on the electrical element with a lead wire passing through the perforation, and adapted to be molded on the outer surface to a sealing layer of polymerized trifluorochloroethylene, said article comprising a uniform molded composition of 80% to 95% by weight of metal powder and a thermoplastic polymer of trifluorochloroethylene having a no strength temperature value between about 240° C. and about 340° C.

10. The sealing device of claim 9 wherein the molded composition comprises 80% to 95% by weight of copper powder.

11. A hermetically sealed electrical resistor comprising a resistance element connecting two metal terminals, a perforated, cup-shaped layer covering each of the metal terminals and soldered thereto, said layer comprising a uniform molded composition of 80% to 95% by weight of metal powder and the remainder a thermoplastic polymer of trifluorochloroethylene having a no strength temperature value between about 240° C. and about 340° C., a lead wire passing through the perforation in each cup-shaped layer and soldered to it at the perforation and to the metal terminal, and a protective layer of a thermoplastic polymer of trifluorochloroethylene jacketing, the entire resistor element except the outer ends of the lead wires, and hermetically bonded to said cup-shaped layer.

12. The hermetically sealed electric resistor of claim 11 wherein the uniform molded composition comprises 80% to 95% by weight of copper powder.

13. A method of sealing an electrical resistor, having metal terminals, which comprises covering each terminal with a perforated layer comprising a uniform molded composition of 80% to 95% by weight of metal powder and the remainder a thermoplastic polymer of trifluorochloroethylene having a no strength temperature value between about 240° C. and 340° C., passing a lead wire through the perforation in each metal-containing layer to contact the metal terminal, soldering the metal-containing layer and lead wires to the metal terminals, and molding a protective jacket comprising a thermoplastic polymer of trifluorochloroethylene about the entire resistor element except the outer ends of the lead wires.

14. A bonding layer capable of being soldered to metal and molded to a layer of thermoplastic polymer of trifluorochloroethylene, said layer comprising a uniform molded composition of 80% to 95% by weight of metal powder and a thermoplastic polymer of trifluorochloroethylene having a no strength temperature value between about 240° C. and 340° C.

LOUIS C. RUBIN.

No references cited.